(12) United States Patent  (10) Patent No.: US 7,119,696 B2
Borugian  (45) Date of Patent: Oct. 10, 2006

(54) SYSTEM FOR ENSURING DRIVER COMPETENCY

(75) Inventor: Dennis A. Borugian, High Point, NC (US)

(73) Assignee: Volvo Trucks North America, Inc., Greenboro, NC (US)

( * ) Notice: Subject to any disclaimer, the term of this patent is extended or adjusted under 35 U.S.C. 154(b) by 555 days.

(21) Appl. No.: 10/092,318

(22) Filed: Mar. 6, 2002

(65) Prior Publication Data
US 2003/0095046 A1 May 22, 2003

Related U.S. Application Data (60) Provisional application No. 60/332,660, filed on Nov. 19, 2001.

(51) Int. Cl.
G08B 23/00 (2006.01)

(52) U.S. Cl. .............. 340/576; 340/575; 340/438; 340/901; 340/988; 340/991; 701/33; 701/35; 701/300

(58) Field of Classification Search ........... 340/439, 340/575, 576, 425.5, 426.1, 825.69, 904, 340/905, 901, 902, 988, 991, 438; 307/10.1, 307/10.2, 10.5; 180/168, 173, 287; 701/213, 701/207, 209, 33, 35, 300
See application file for complete search history.

(56) References Cited

U.S. PATENT DOCUMENTS

| | | | |
|---|---|---|---|
| 4,359,725 A | 11/1982 | Balogh et al. | |
| 4,750,197 A | 6/1988 | Denekamp et al. | |
| 5,068,656 A | 11/1991 | Sutherland | |
| 5,465,079 A | 11/1995 | Bouchard et al. | |
| 5,532,690 A * | 7/1996 | Hertel | 340/989 |
| 5,570,087 A | 10/1996 | Lemelson | |
| 5,684,455 A | 11/1997 | Williams et al. | |
| 5,729,199 A | 3/1998 | Cooper et al. | |
| 5,729,619 A | 3/1998 | Puma | |
| 5,740,548 A | 4/1998 | Hudgens | |
| 5,805,079 A | 9/1998 | Lemelson | |
| 5,812,067 A * | 9/1998 | Bergholz et al. | 340/5.52 |
| 5,813,989 A | 9/1998 | Saitoh et al. | |
| 5,815,070 A | 9/1998 | Yoshikawa | |
| 5,850,193 A | 12/1998 | Shimoura et al. | |
| 5,905,433 A | 5/1999 | Wortham | |
| 5,917,433 A | 6/1999 | Keillor et al. | |
| 5,919,239 A | 7/1999 | Fraker et al. | |
| 5,969,433 A | 10/1999 | Maggiora et al. | |
| 5,986,543 A * | 11/1999 | Johnson | 340/426.19 |
| 6,060,989 A | 5/2000 | Gehlot | |
| 6,114,960 A * | 9/2000 | Gilmour | 340/571 |

* cited by examiner

Primary Examiner—Hung Nguyen
(74) Attorney, Agent, or Firm—Martin Farrell (57) ABSTRACT

A method and apparatus for detecting conditions that indicate unauthorized usage of a vehicle and for responding to the conditions that indicate the vehicle is being used in an unauthorized or unintended way. A vehicle computer is used to monitor conditions of a driver and unintended usage. The computer is also used to respond to conditions that indicate an unauthorized or unintended vehicle usage has occurred.

8 Claims, 10 Drawing Sheets

SYSTEM FOR ENSURING DRIVER COMPETENCY

This application claims benefit of Ser. No. 60/332,660 Nov. 19, 2001.

TECHNICAL FIELD

The present invention relates to a method and apparatus for monitoring unauthorized usage of a vehicle and, more particularly, the present invention relates to a method and apparatus that detects conditions of a driver and a vehicle that indicate operation of the vehicle is unauthorized and provide a response to the detected conditions.

BACKGROUND ART

Unintended usages of a vehicle, such as a tractor trailer, include driving under the influence of drugs or alcohol, driving of a vehicle when fatigued, driving of a stolen vehicle, deviating from a planned route, driving a vehicle into a restricted area, uncoupling a trailer at an unplanned location, and driving a vehicle in need of maintenance.

Driving of a vehicle by an impaired operator greatly increases the chance that the vehicle will be involved in an accident. Federal Motor Carrier Safety Standard #49 C.F.R. 392.3 requires fatigue impaired drivers to stop. According to the National Highway Traffic Safety Administration (NHTSA), one out of eight traffic fatalities in 1998 resulted from a collision with a large truck. Alcohol related fatalities accounted for 38% of all traffic fatalities in 1998. According to the Commercial Car Journal (CCJ) survey, 55% of drivers violate hours of service (HOS) rules by driving more than 10 hours without an 8 hour break. Stolen tractors and/or trailers cost fleet owners a large sum of money per occurrence. Vehicles may become unsafe when they are not properly maintained.

Prior art disclosures have dealt with monitoring vehicle drivers. Examples include detecting a drowsy driver by monitoring eyelid movement of the driver, detecting drowsiness by sensing meandering of a vehicle in a lane of a road, monitoring heart rate and skin vibrations to detect the mental condition of the driver, testing a drivers alertness by requiring the driver to move a turn signal lever in a sequence of requested directions, detecting intoxication by monitoring a driver's iris, monitoring acceleration and deceleration and steering irregularities to determine a drivers fitness.

Prior art disclosures have dealt with tampering with a trailer. It is known in the prior art to sense penetration into a trailer. A camera and sound recorder is used during theft. One prior art theft prevention system monitors doors and alerts a central control.

It is known in the prior art to track travel of a long haul truck within an acceptable rectangular zone and report exceptions to a central control or generate an exception report.

What is needed is an interactive monitoring system that detects conditions that indicate unauthorized vehicle usage and provides for a response to the detected conditions that assures that the usage is not unauthorized or shuts the vehicle down.

DISCLOSURE OF INVENTION

The present invention relates to a method and apparatus for monitoring unauthorized usage of a vehicle. One embodiment of the method of monitoring unauthorized usage of a vehicle concerns testing the competency of a driver to operate a motorized vehicle. A randomly generated number is displayed in the vehicle for a given period of time. A user interface is provided in the vehicle for the driver to enter digits that correspond to the randomly generated number. The system determines whether the driver has entered the digits that correspond the randomly generated number in a proper sequence within a given period of time. In the exemplary embodiment, a vehicle computer is used to generate the randomly generated number. The user interface is connected to the vehicle computer. A display is coupled to the computer for displaying the randomly generated number. The computer is programmed to determine whether the driver has entered digits that correspond to the randomly generated number in a proper sequence.

In one embodiment of the method of testing the competency of a driver to operate a motorized vehicle, a forward sequence notation or a reverse sequence notation is displayed. The forward or reverse sequence notation provides an indication to the driver to enter the digits in one of a forward sequence or a reverse sequence. The proper sequence corresponds to the displayed sequence notation. A driver reaction time may be logged when it is determined that the driver has entered digits that correspond to the randomly generated number in the proper sequence within the given period of time. The driver is retested after a given period of time. The driver may be required to enter a driver identification code before the randomly generated number is displayed. A new driver is tested when the driver enters a driver identification code. At least one of the driver reaction time and an ability to enter the digits that correspond to the randomly generated number are logged when the driver fails to enter digits that correspond to the randomly generated number in the proper sequence within the given period of time. A central control is notified when the driver has failed to enter the digits that correspond to the randomly generated number in the proper sequence within a given period of time. The vehicle may be disabled when the driver fails to enter digits that correspond to the randomly generated number in the proper sequence within the given period of time.

In one embodiment, a vehicle is disabled when a potential theft occurs. The system determines that a driver is not authorized to operate the vehicle. The system also determines that the vehicle has deviated from a planned route. The vehicle is disabled when it is determined that the driver is not authorized to operate the vehicle and has deviated from the planned route.

Variations of the method of disabling a vehicle when a potential theft occurs include tracking the location of the vehicle and notifying a central control location when it is determined that the driver is not authorized to operate the vehicle and it is determined that the vehicle has deviated from the planned route. In the method, the driver may be requested to enter an authorized driver code and route code within a given period of time. The system will determine whether an authorized driver code has been entered by the driver. The vehicle will be disabled if an authorized driver code is not entered by the driver.

In one embodiment, a vehicle computer and a global positioning system are used to determine that the driver is not authorized to operate the vehicle and the vehicle has deviated from the planned route. The vehicle computer has an interface that allows the driver to enter a driver authorization code. The computer is programmed to determine whether the driver is authorized to operate the vehicle. The global positioning system is coupled to the computer for determining that the vehicle has deviated from the planned route. The computer is programmed to disable the vehicle when the driver is not authorized and the vehicle has deviated from the planned route.

In one embodiment, a vehicle is disabled when a predetermined number of service hours is exceeded. The system determines whether an allowable number of service hours has been exceeded by a driver. A central control is notified when the allowable number of vehicle service hours has been exceeded by the driver. The system determines whether the central control provided authorization to exceed the allowable number of service hours. The driver is notified that the vehicle will be disabled within a given period of time when authorization to exceed the allowable number of vehicle service hours is not granted. The vehicle is then disabled.

In variations of the method for disabling a vehicle when a predetermined number of service hours is exceeded includes reactivating the vehicle by entering a valid drivers code. The driver code may be revalidated after a defined rest period has lapsed.

In one embodiment, a vehicle computer and a communication system are used to disable a vehicle when a predetermined number of service hours is exceeded. The vehicle computer is programmed to determine whether an allowable number of service hours has been exceeded by the driver. The communication system is coupled to the computer for notifying the central control when the allowable number of service hours has been exceeded. The communication system is configured to receive authorization from the central control to exceed the allowable number of service hours and to notify the driver that the vehicle would be disabled within the given period of time when authorization to exceed the number of allowable vehicle service hours is not granted. The computer is programmed to disable a vehicle when authorization to exceed the allowable number of vehicle service hours is not granted by the central control.

In one embodiment, a route traveled by a vehicle is controlled. An authorized route is defined with an acceptable deviation radius. When it is determined that a location of the vehicle is outside the acceptable deviation radius, the vehicle is shut down. A computer and global positioning system may be used to control the route traveled by the vehicle. The computer is programmed to define the authorized route with the authorized acceptable deviation radius. The global positioning system is coupled to the computer for determining location of the vehicle. The computer is programmed to determine whether the location of the vehicle is outside the acceptable radius. The computer shuts down the vehicle if the vehicle is outside the acceptable deviation radius for a predetermined period of time.

In variations of the method for controlling a route traveled by the vehicle, the driver and a central controller is notified that the vehicle has deviated from the authorized route. An interface between the driver and the central control is provided that allows the driver to request authorization to deviate from the authorized route. The system determines whether authorization from the central control to deviate from the authorized route is granted. The vehicle is allowed to deviate from the authorized route when authorization to deviate from the authorized route is granted by the central control. The vehicle is shut down if the vehicle fails to enter the acceptable deviation radius or obtain authorization to deviate from the authorized route from the central control. Emergency start instructions may be displayed when the vehicle is shut down. Control information may be displayed that allows emergency personnel to obtain a valid driver code and temporary route deviation code.

In one embodiment, a route traveled by the vehicle is controlled. A perimeter is defined around a restricted area. When it is determined that a location of the vehicle is inside the perimeter around the restricted area, the vehicle is shut down. The computer and a global positioning system may be used to define the perimeter around a restricted area and determine whether the location of the vehicle is inside the perimeter. The computer is programmed to define a perimeter around the restricted area. The global positioning system is coupled to the computer for determining the location of the vehicle. The computer is programmed to determine whether a location of the vehicle is inside the perimeter. The computer shuts the vehicle down if the vehicle is inside the perimeter.

In variations of the method for controlling a route traveled by a vehicle the driver, a central controller, and a restricted area site are notified that the vehicle is in the perimeter around the restricted area. The system determines whether authorization from the restricted areas site to enter the perimeter of a restricted area is granted. The vehicle is allowed to enter the perimeter of a restricted area when authorization to enter the perimeter is granted. The vehicle is shut down if the vehicle fails to leave the perimeter or obtain authorization to enter the perimeter from the restricted area site. Law enforcement officials may be notified that the perimeter has been breached. The vehicle may be reactivated by entering a valid drivers code and the temporary route deviation code. Emergency start instructions may be displayed when the vehicle is shut down. Contact information may be displayed that allows emergency personnel to obtain a valid driver code and a temporary route deviation code that allows the vehicle to be moved.

In one embodiment, uncoupling of a vehicle trailer is monitored. A planned trailer uncoupling area is defined. When it is determined that the trailer has been uncoupled outside the planned uncoupling area, the system determines the location of the vehicle with a global positioning system. Uncoupling of the vehicle trailer may be monitored using an onboard vehicle computer and a global positioning system. The vehicle computer is programmed to define a planned trailer uncoupling area. The global positioning system is coupled to the computer for determining the location of the trailer. The computer is programmed to determine that the trailer has been uncoupled outside the planned uncoupling area.

In variations of the method for monitoring a vehicle trailer, a trailer battery backup is activated. The doors of the trailer are automatically locked. The fifth wheel of the vehicle is automatically locked. Spring brakes of the trailer are automatically applied. The tires may be automatically deflated. The trailer battery backup, the doors of the trailer, the fifth wheel of the vehicle, tire inflation and/or deflation and the spring brakes of the trailer may be controlled by the on board vehicle computer.

In one embodiment, a location of the vehicle is monitored when the main electrical power that is supplied to an onboard vehicle computer is removed. The system determines a main electrical power supply is not available to the vehicle onboard computer. A battery backup is activated to power the vehicle onboard computer. The system determines the location of the vehicle using a global positioning system. The location of the vehicle is transmitted to a central control. An onboard vehicle computer, a backup battery, a global positioning system and a communication system may be used to monitor the vehicle location when electrical power supplied to the onboard vehicle computer is removed. The onboard vehicle computer is programmed to determine that the main electrical power supply is not available to the vehicle onboard computer. The backup battery is coupled to the onboard computer. The computer is programmed to activate the battery backup when the main electrical power supply is not available to the computer. The global positioning system is coupled to the computer for determining the location of the vehicle. The communication system is coupled to the computer for transmitting the location of the vehicle to a central control.

In one embodiment, vehicle maintenance is scheduled. Vehicle mileage is compared to a predetermined mileage required for maintenance. A number of hours a vehicle operation is compared to a predetermined number of hours of vehicle operation. An indication that maintenance is required is provided when the vehicle mileage exceeds the predetermined mileage or when the number of hours of vehicle operation exceeds the predetermined number of hours of vehicle operation. The system identifies the location of the vehicle and provides directions to a maintenance facility that is near the vehicle. An onboard vehicle computer and display may be used to schedule vehicle maintenance. The onboard vehicle computer is programmed to compare the vehicle mileage to the predetermined mileage required for maintenance and to compare the number of hours of vehicle operation to a predetermined number of hours of vehicle operation. The display is coupled to the computer for providing an indication that maintenance is required while vehicle mileage exceeds the predetermined mileage or when the number of hours of vehicle operation exceeds the predetermined number of hours of vehicle operation. The global positioning system is coupled to the computer for identifying the location of the vehicle. The computer is programmed to provide directions to the maintenance facility that is near the vehicle.

In one embodiment of the method for scheduling vehicle maintenance, service is scheduled automatically at a maintenance facility for the vehicle. The vehicle computer may be programmed to automatically schedule the service at the maintenance facility.

Additional features of the invention will become apparent and a fuller understanding obtained by reading the following detailed description in connection with the accompanying drawings.

BEST MODE FOR CARRYING OUT THE INVENTION

The following disclosure concerns a system 10 that detects various conditions of a vehicle 12 and a driver 14 or operator that indicate that the vehicle is being used in an unauthorized manner and responding to the detected conditions.

Figure 1:
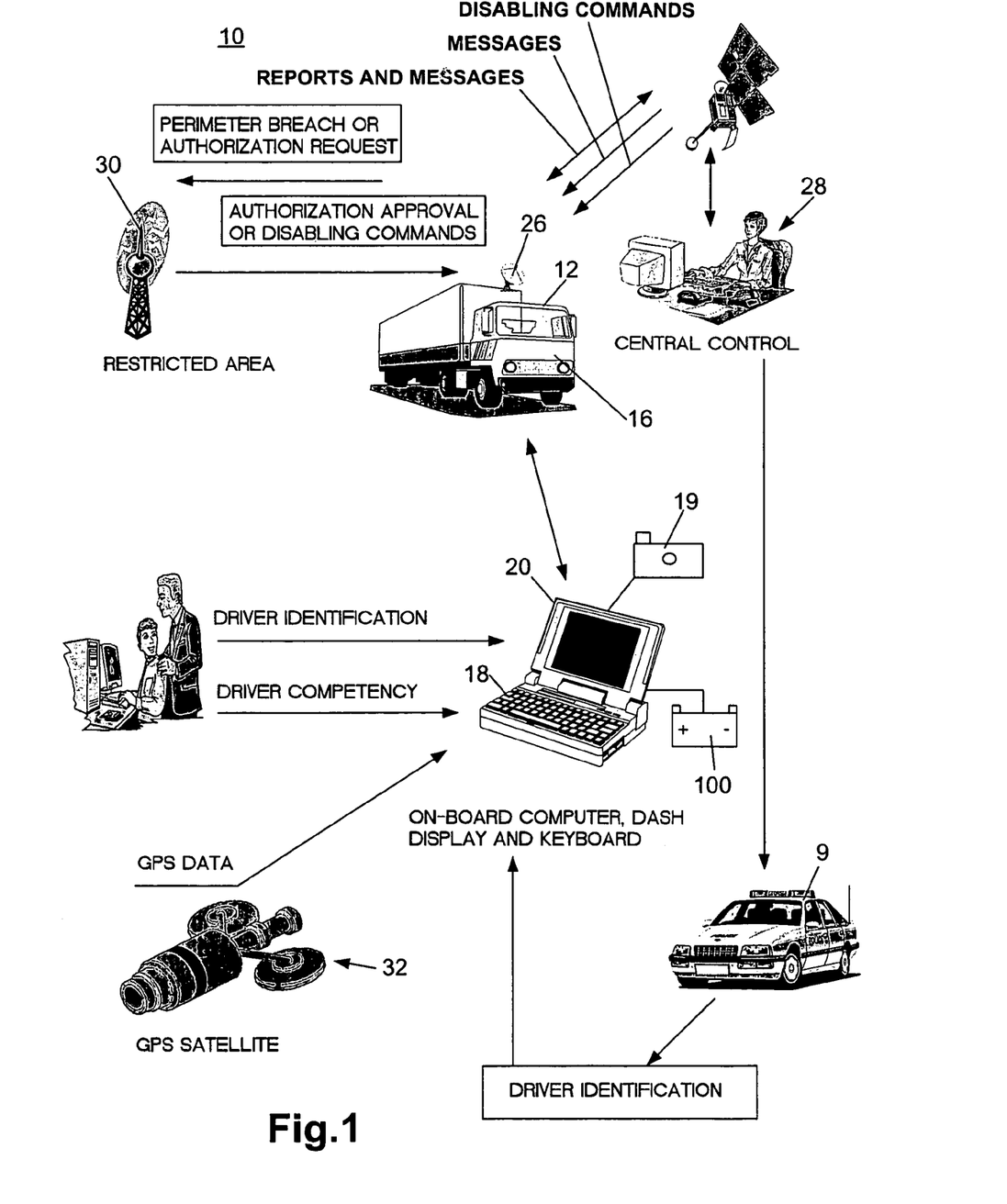
FIG. 1 is a schematic representation of a system for monitoring unauthorized usage from a vehicle.
Figure 2:
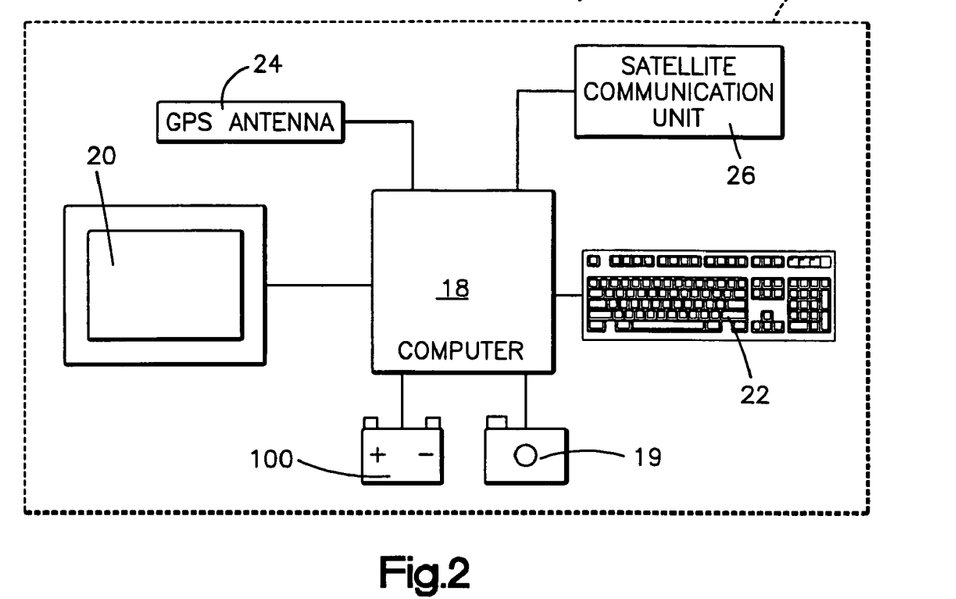
FIG. 2 is a schematic representation of hardware included on a vehicle used in the system for monitoring unauthorized usage.

Referring to FIGS. 1 and 2, the illustrated vehicle 12 is a tractor trailer 16a, 16b. It should be readily apparent that the system could be used with any type of vehicle, such as an automobile. In the illustrated embodiment, the tractor 16a is equipped with an onboard computer 18, a display 20 coupled to the onboard computer 18 and a user interface 22 coupled to the onboard computer 18. The display 20 is located in the vehicle dash in the exemplary embodiment. The display displays messages from the onboard computer 18. The display 20 is also used for communication with central control personnel. In the illustrated embodiment, a digital camera 19 is coupled to the computer 18. The digital camera is mounted inside the vehicle and is positioned to take a picture of the driver 14. The camera is mounted on the vehicle dash or the driver's side "A" pillar facing the person in the driver's seat.

Referring to FIG. 2, a global positioning system antenna 24 and a satellite communications unit 26 are coupled to the computer 18. The computer 18 is used to monitor driver identification, hours behind the wheel, travel distance, driver reaction time and state of alertness, global positioning system information, such as location, time and date, speed, direction and distance traveled, trailer coupling status, main power supply to the unauthorized vehicle usage system (UVU) 10 and vehicle maintenance data and status relative to planned vehicle maintenance and status.

Referring to FIG. 1, the system 10 monitors driver identification and driver competency using the user interface 22. The system 10 communicates with a central control 28 and a restricted area site 30 and receives information from a global positioning satellite 32 to detect conditions that indicate that the vehicle 12 is being used in an unauthorized fashion.

Figure 5:
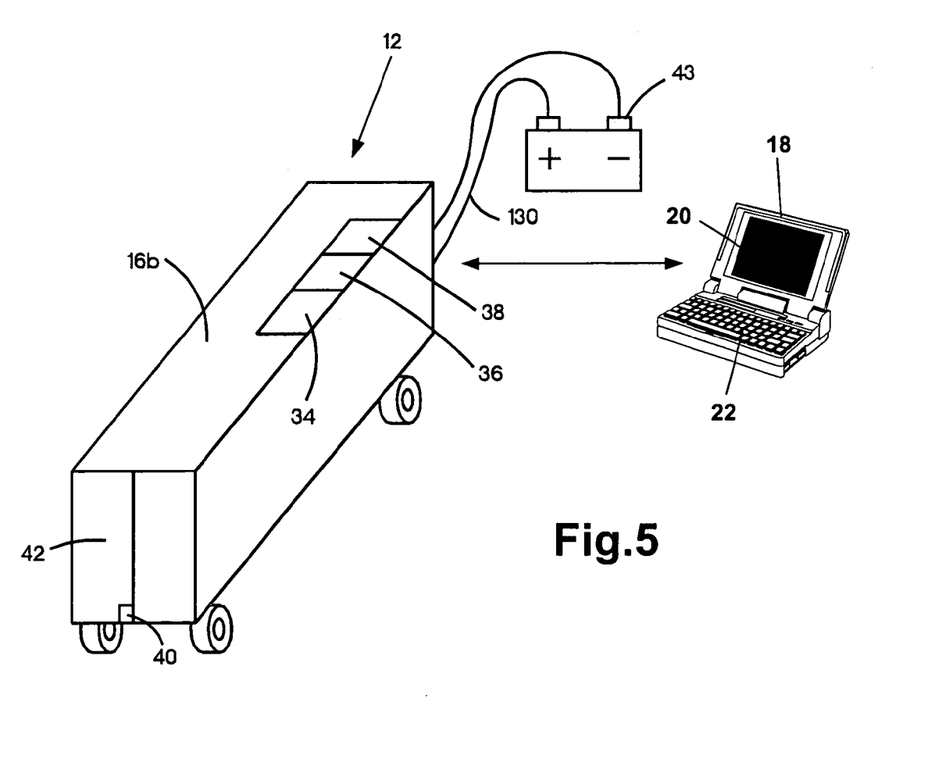
FIG. 5 is a schematic illustration of a trailer in communication with a vehicle computer.

Referring to FIG. 5, in one embodiment the trailer 16b includes a separate onboard computer 34, a global positioning system antenna 36 and a satellite communications unit 38.

Figure 3:
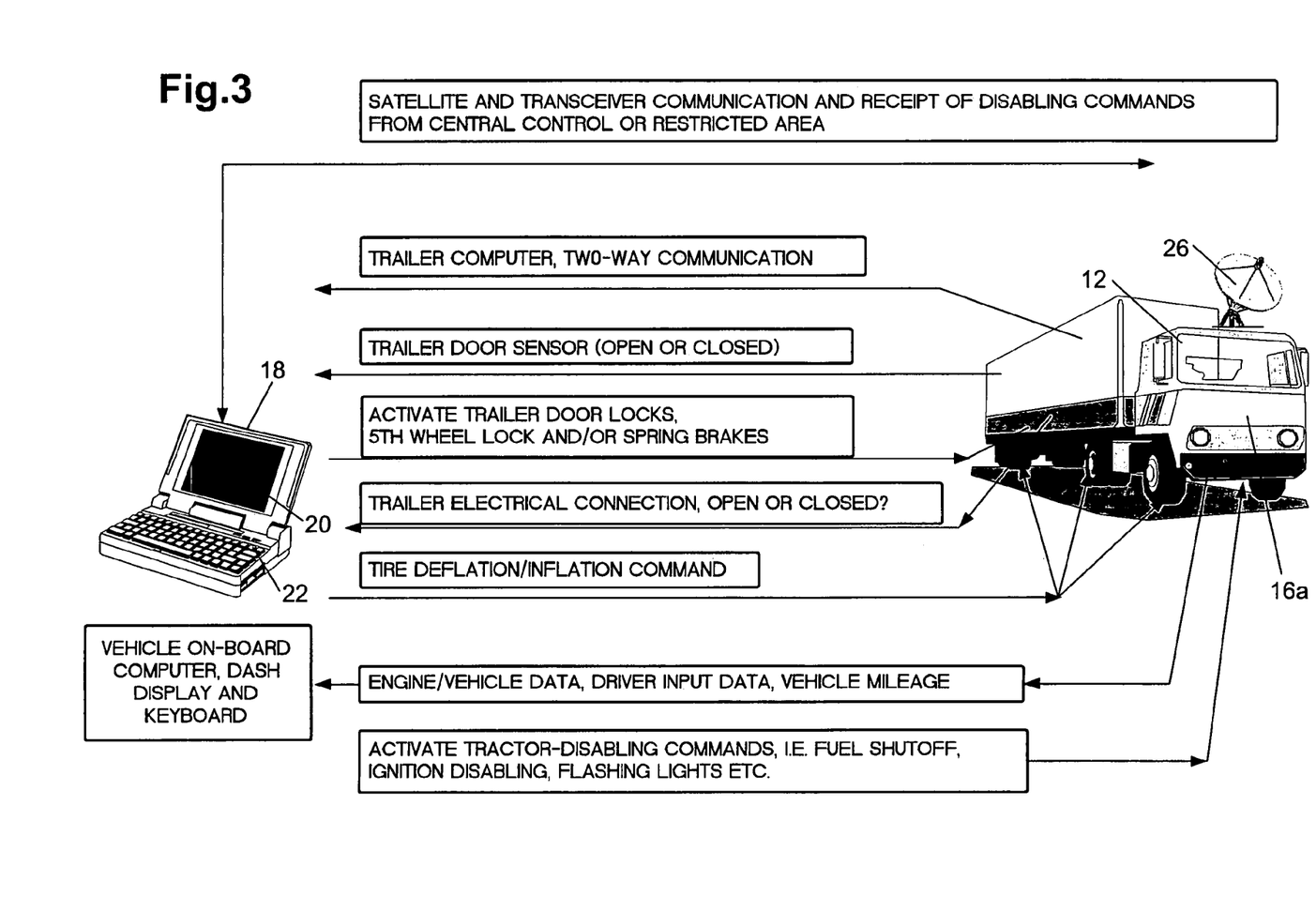
FIG. 3 is a flow chart showing communication between an onboard computer, a driver, a tractor and trailer, a central control and a restricted area.
Figure 4:
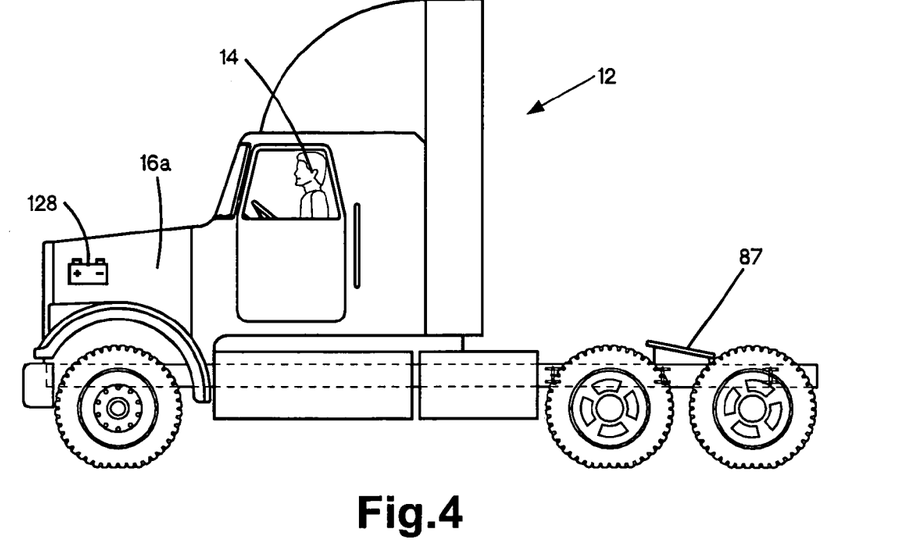
FIG. 4 is a side elevational view of a tractor.

FIG. 3 shows the communication between the on-board computer, the driver, the tractor & trailer, central control, and restricted areas. The computer 18 is linked to the satellite communications unit 26 which allows satellite and transceiver communication and receipt of disabling commands from the control center 28 or restricted area 30. The satellite communications unit 26 of the tractor 16a and the satellite communications unit 38 of the trailer 16b allow two way communication between the tractor 16a and the trailer 16b. A sensor 40 is included on a trailer door 42 that is monitored by the onboard computer 18 or 34 to determine whether the trailer door 42 is open or closed. The onboard computer 18 monitors whether the trailer electrical connection 43 is open or closed. The onboard computer 18 controls inflation and deflation of tires 44 of the tractor trailer 16*a*, 16*b*. The onboard computer 18 monitors engine and vehicle data, driver input data and vehicle mileage. The onboard computer 18 activates tractor disabling commands, such as fuel shut-off, ignition disabling and flashing lights, etc.

Figure 6:
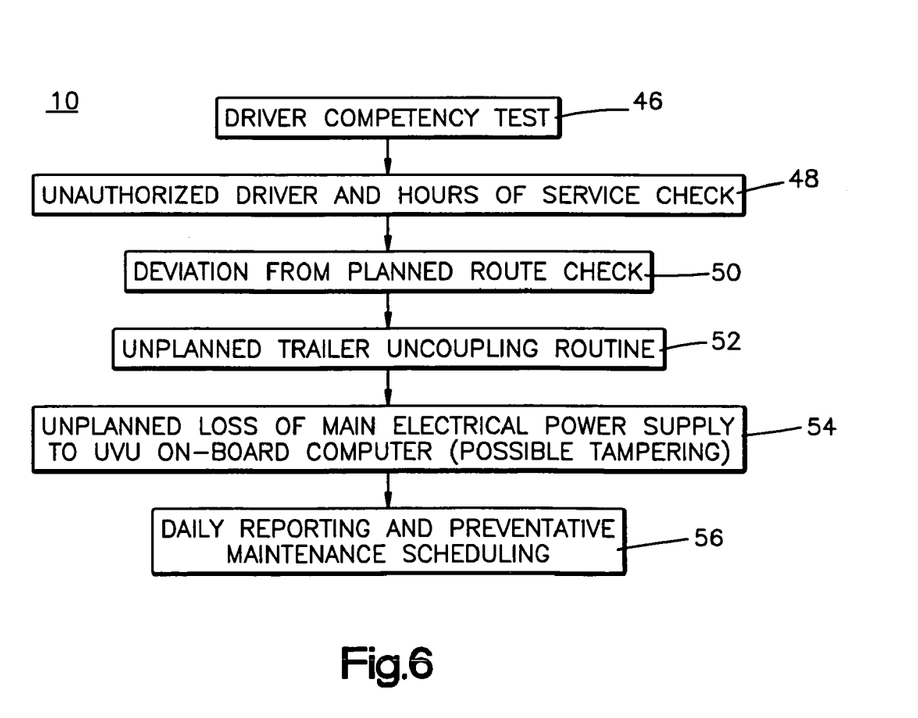
FIG. 6 is a flow chart showing steps performed by a system for monitoring unauthorized vehicle usage (UVU)

FIG. 6 is a flow chart that lists tests performed by the system 10 that detect conditions that indicate the vehicle is being used in an unauthorized manner or by an unauthorized person. Although FIG. 6 illustrates six tests that are performed by the illustrated system 10 to detect conditions that indicate unauthorized vehicle usage, it should be readily apparent to those skilled in the art that each of the tests listed on FIG. 6 can be used separately to detect conditions that are indicative of unauthorized vehicle use. In the illustrated embodiment, the system 10 includes a driver competency test 46 and unauthorized driver and hours of service check 48, a deviation from planned route check 50, an unplanned trailer uncoupling routine 52, an unplanned loss of main electrical power to the unauthorized vehicle use onboard computer check 54 and a daily reporting and preventative maintenance scheduling check 56.

Figure 7:
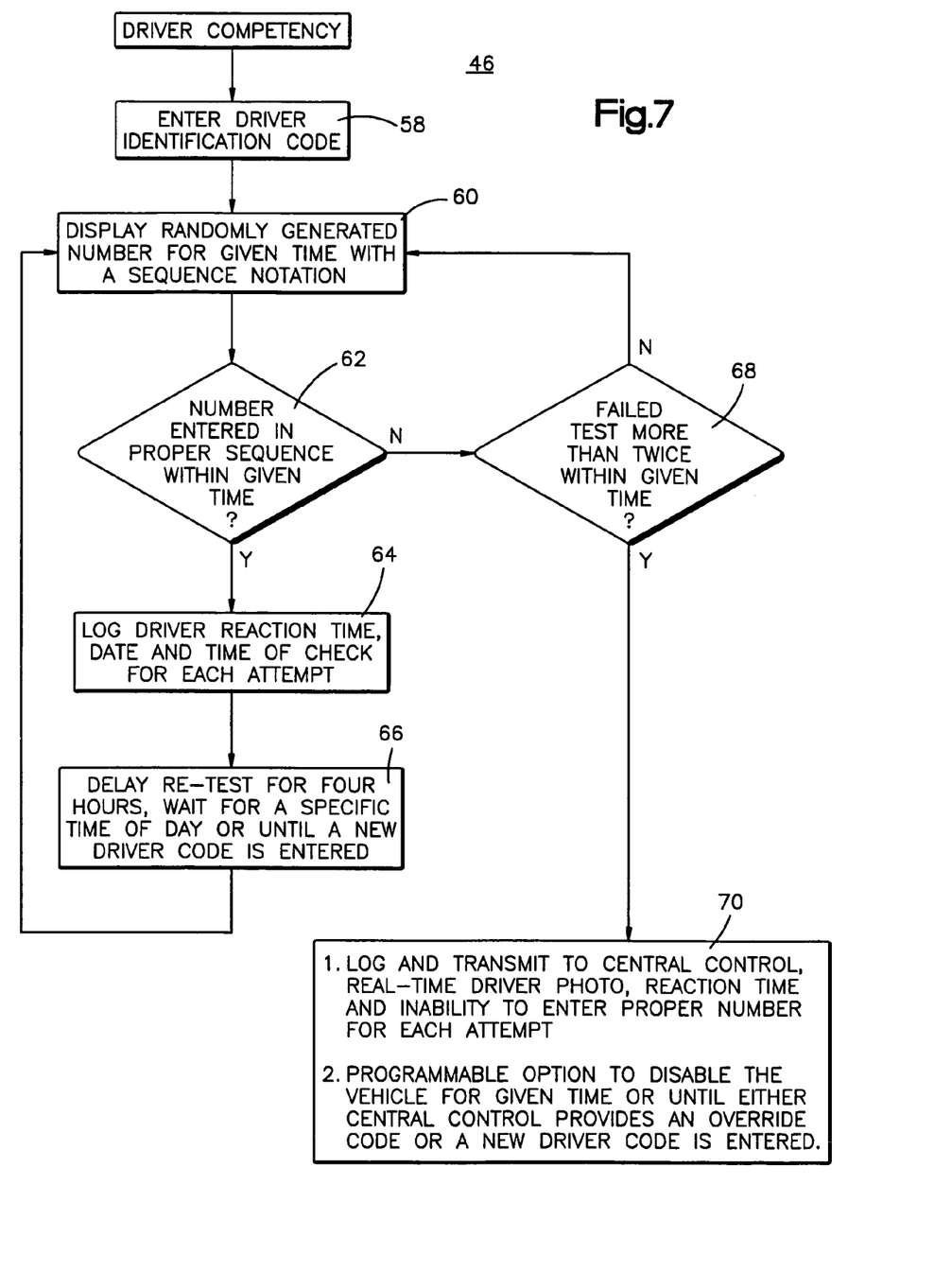
FIG. 7 is a flow chart depicting a system for determining driver competency.

FIG. 7 illustrates the driver competency test 46. In the illustrated embodiment, the driver is prompted to enter a driver identification code at 58. A randomly generated number is flashed on the display 20 at 60. In one embodiment, the randomly generated number is a four digit number that is flashed on the driver's display screen 20 for four seconds. In one embodiment, a sequence notation, such as a forward or reverse sequence notation, is displayed with the randomly generated number. It should be readily apparent that the number of digits of the number could be a number other than four.

In the illustrated embodiment, a sequence direction notation is also shown on the display 20. For example, a forward indicator requires the driver to enter the number as flashed on the display. A reverse indicator requires that the driver enter the same number, but by entering the digits of the number in reverse order. For example, if 4935 were shown on the driver's display 20, along with a "forward" indicator, the driver would be expected to enter 4935. If the number 4935 where shown on the driver's display along with "reverse," the driver would be expected to enter 5394. In the exemplary embodiment, the number of test digits can be increased at the option of the vehicle owner. The onboard computer 18 randomly selects the entry sequence required, "forward" or "reverse" in the illustrated embodiment. The onboard computer 18 determines whether the number entered by the driver is the correct number entered in the proper sequence within a given time at 62. FIG. 7 illustrates that the given time to enter the number in the proper sequence is within 8 seconds. However, any times listed on the flow charts are for illustrative purposes only and any time for entering the number in the proper sequence can be selected.

If the number is entered in the proper sequence within the given period of time, the onboard computer 18 logs the driver reaction time, date and time of the driver competency check for each attempt at 64. In the illustrated embodiment, a retest is delayed for a few hours, a specific time of the day or until a new driver code is entered 66.

If the driver failed to enter the displayed number in a proper sequence within the given period of time, the onboard computer 18 determines whether the driver had failed the test more than twice within the given period of time at 68, such as 15 minutes in one embodiment. If the driver failed the test less than three times, the driver is tested again. If the driver failed the test more than twice within a given period of time, the driver reaction time and inability to enter the proper number in the proper sequence is logged and central control is notified of the situation at 70. In the illustrated embodiment, the onboard computer 18 may be programmed to optionally disable the vehicle for one hour or until either central control provides an override code or a new driver code is entered.

In the exemplary embodiment, when the driver fails the test more than twice within the given period of time, fifteen minutes in the illustrated embodiment, the system logs and transmit to central control 28 a real time photo of the driver, the reaction time and the inability to enter the proper number for each attempt at 70.

In the exemplary embodiment, the driver competency test 46 is required under the following conditions:
 1. Initial vehicle start-up;
 2. After a predetermined period of time within a normally allowed hours of services. This time may be the function of the planned route and timing. Generally, the predetermined time would be after midway through the normal hours of service. However, the driver could be given the flexibility to perform the retest any time during the second half of his allowable hours of service, allowing the driver to perform the test at a more convenient stopping point for food or fuel.
 3. Each hour beyond the normally allowed hours of service.

In the exemplary embodiment, the driver's reaction time is kept in a history file. In the illustrated embodiment, the user interface 22 is used to enter the digits of the displayed number. In the illustrated embodiment, the user interface is a keyboard. The user interface may also be a keypad or the stalk of an electronic communications unit. Such as the stalk disclosed in provisional patent application Ser. No. 60/332,865, entitled "INTEGRATED VEHICLE COMMUNICATIONS DISPLAY," filed on Nov. 6, 2001, that is incorporated herein by reference in its entirety. The random number may include numeric, alphanumeric or alphabetic symbols. The display 20 may display the words "forward" or "reverse" or the letters "F" or "R" or arrow signals "→" or "←" to indicate that a forward sequence or a reverse sequence is required. For a higher degree of difficulty, the test display can show forward minus some value or reverse minus some value or forward or reverse plus some value. For example, F−1 or R+2.

The degree of difficulty can be tailored to the load being carried. General loads would use the first level of the test. Driver's hauling flammable liquids, hazardous or high value material would be required to pass the test using the higher or second level of difficulty. The test measures alertness, the ability to concentrate and reaction time. The degree of difficulty of the test can be raised by adding digits.

Examples of two possible levels of difficulty for the test follow:

| Degree of Difficulty | Requested Sequence | Displayed Request | Proper Response |
|---|---|---|---|
| NORMAL | F | 5894 | 5894 |
|  | F − 1 | 6231 | 6230 |
|  | R | 7684 | 4867 |
|  | F | AXZ2 | AXZ2 |
|  | R | W5BC | CB5W |
| HIGHER | R − 2 | 6527 | 7254 |
|  | F + 2 | 66251 | 66253 |
|  | R | 546W7 | 7W645 |

The computer 18 records the result of the test and gives a warning when the test is failed, but does not necessarily impede the ability to start or operate the vehicle. The driver competency test 46 can be overwridden in case of an emergency. However, overriding the test will be recorded as an intentional override for a given driver and will be provided in the driver history for the fleet manager. Recorded results of the driver competency test 46 can be used to counsel the driver, for real time intervention by the fleet manager and may pass liability from the fleet to the driver in case of an accident. The driver competency test 46 assesses driver fatigue and substance abuse.

In one embodiment, if the driver fails the test and ignition is restricted based upon the failure of the driver competency test 46, an emergency override button can be depressed by the driver for overriding the first negative evaluation and for starting the engine during emergency conditions. However, the override action would be noted for the specific driver, along with the date, time and odometer reading of the tractor 16a. The fleet manager may restrict the driving time or distance for an emergency override. This would allow emergency movement of the vehicle, but would require a satisfactory test to continue beyond a certain time or distance.

The specific reaction time can be preset or left up to the fleet manager's judgement. The fleet manager can set the system to require a retest randomly or at set intervals like every six to twelve hours. If the driver sees a request for retest on the display 20, the driver should pull over within a set period of time to perform the test only after the vehicle is safely parked. The driver competency test 46 gives the driver a warning if reaction times are not acceptable and that the driver should consider pulling off the road until the driver is able to exhibit proper reaction times. Acceptable reaction times for the test can be reduced as the driver gains experience.

When a driver uses the emergency override feature, ignores the computer request for retest or continues to drive with known poor reaction time, a signal is sent via satellite or cell phone to the fleet manager giving real time notification of a potentially impaired driver operating the vehicle and its location in the exemplary embodiment. The driver competency test 46 can automatically, or upon the demand of the fleet manager disable the cruise control feature of the tractor 16a.

Figure 8:
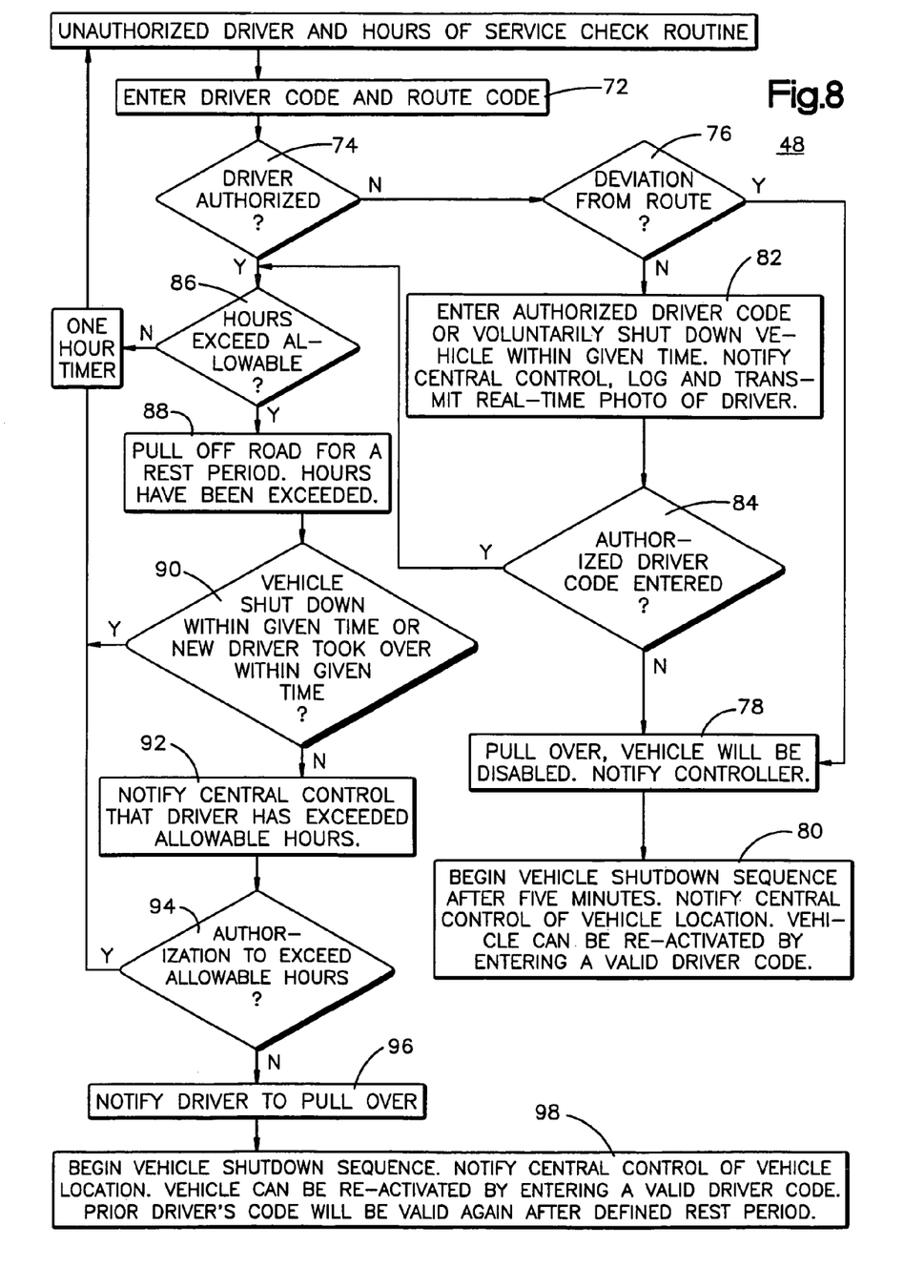
FIG. 8 is a flow chart depicting a system for determining driver authorization and checking hours of service.

FIG. 8 is a schematic showing the unauthorized driver and hours of service check 48. The unauthorized driver and hours of service check 48 detects violations of federal hours of service requirements, unauthorized usage and route deviation and has the ability to locate a stolen vehicle. The driver is prompted to enter an authorized driver code and route code 72. In the exemplary embodiment, the vehicle 12 does not run longer than a predetermined amount of time, such as five minutes, if an authorized driver code and route code are not entered. In the exemplary embodiment, a one time grace period is available for emergency purposes to move the vehicle away from a hazardous condition, like sitting on railroad tracks. The vehicle owner can vary the times shown on FIG. 8.

The onboard computer 18 determines whether the driver is authorized 74. If the driver is not authorized, the onboard computer 18 determines whether the tractor trailer 16a, 16b has deviated from the authorized route 76. The onboard computer 18 determines that the tractor trailer 16a, 16b has deviated from the authorized route by comparing the position of the tractor trailer 16a, 16b provided to the onboard computer 18 by the global positioning system 24 to the route programmed into the onboard computer 18 as a result of entering a route code. The combination of an unauthorized driver and deviation from the authorized route provides an indication that the tractor trailer 16a, 16b has been stolen or highjacked. The driver is notified to pull over as the vehicle will be disabled within a given period of time, within five minutes in the illustrated embodiment and the controller 28 is notified at 78.

Vehicle shut down begins after the given period of time has elapsed at 80. Central control is notified of the vehicle's location. The vehicle can be reactivated by entering a valid driver code.

When the onboard computer 18 determines that the driver is not authorized, but the tractor trailer 16a, 16b has not deviated from the authorized route, the system 10 asks the driver to enter an authorized driver code or voluntarily shut down the vehicle within a given period of time 82. The central control 28 is notified that the driver is not authorized by a message that it sent from the vehicle 12 through the satellite communications unit 26 in the exemplary embodiment. After the given period of time, ten minutes in one embodiment, has elapsed, the onboard computer 18 determines whether an authorized driver code was entered at 84. If the computer 18 determines that an authorized driver code was not entered the driver is notified to pull over as the vehicle will be disabled with a given period of time 78, five minutes in the illustrated embodiment. The central control 28 is notified that the driver is not authorized and in the illustrated embodiment a photo of the driver is transmitted to central control. Vehicle shut down begins after the predetermined time. Central control 28 is notified of the vehicle location. The vehicle will be reactivated by entering a valid driver code 80.

When the computer 18 determines that the driver is authorized at 74 or that an authorized driver code was entered at 84 the computer 18 determines whether a maximum allowable number of hours has been exceeded 86. If the maximum number of allowable hours has not been exceeded, the unauthorized driver and hours of service check is repeated after a given period of time, one hour in the illustrated embodiment. If the predetermined maximum number of hours allowed is exceeded, the driver is notified to pull off the road for a rest period as hours have been exceeded 88. The computer 18 determines whether the driver shut down the vehicle within a predefined time, thirty minutes in one embodiment or whether a new driver took over 90. The computer determines whether the vehicle shut down by monitoring the vehicle. The computer determines whether a new driver took over by determining whether a new driver code was entered.

If the vehicle was shut down within a predefined time, thirty minutes in the illustrated embodiment, or a new driver took over, the unauthorized driver and hours of service check 48 is periodically repeated every one hour in the illustrated embodiment.

If the driver did not shut the vehicle down within thirty minutes and a new driver did not take over, the onboard computer 18 causes the satellite communications unit 26 to notify central control that the driver has exceeded the maximum number of allowable hours 92. In the exemplary embodiment, central control 28 may give the driver authorization to exceed allowable hours by one hour. The onboard computer 18 monitors the satellite communications unit 26 to determine whether central control gave the driver a revised authorization code to exceed allowable hours. The onboard computer 18 determines whether central control issued and the driver entered the revised authorization code to exceed the allowable hours by one hour at or a new driver took over at 94.

If central control gave the driver an authorization code that was entered by the driver to exceed allowable hours by one hour, the unauthorized driver and hours of service check is performed again at a predefined time, one hour in the illustrated embodiment. If central control did not give a revised authorization code to exceed allowable hours or the driver did not enter the revised authorization code to exceed allowable hours by one hour, the driver is notified to pull over as the vehicle will be disabled after a predefined time has elapsed at 96, thirty minutes in one embodiment. Vehicle shut down begins after the predefined time, thirty minutes in the exemplary embodiment has lapse 98. Central control 28 is notified of the vehicle's location. The vehicle can be reactivated by entering a valid driver code. The prior drivers code will be valid again after the defined rest period has lapsed. In the illustrated embodiment, the system 10 notifies central control and logs and transmits a real time photo of the driver when the unauthorized driver and hours of service check 48 determines that the driver is not authorized.

Allowable hours of service can be entered into the onboard computer 18 that can keep track of each identified authorized driver to track the number of hours the driver operates the vehicle. Using an internal clock or time obtained from a global positioning system the onboard by computer 18 can also determine when enough time has elapsed to consider the driver to have had enough time to rest and resume driving.

The vehicle owner can predetermine the degree to which the vehicle is disabled or shut down. The disabling or shut down can include activation of a fifth wheel or trailer door locks.

Vehicle operation without proper driver identification is considered to be unauthorized use of a vehicle. Prolonged use of the vehicle by an apparently known driver who fails to take or pass the competency test 46 results in a message being sent via cell phone, radio or satellite transmission to the fleet manager. Global positioning system data will be sent to the fleet manager alerting the fleet manager of the vehicle's location. In the illustrated embodiment, manual entry of the driver identification is employed since keys and bar codes could be inadvertently left in the vehicle. Manual entry of the driver identification number may also form part of the driver competency test 46.

After a limited number of attempts are made to enter the driver identification number the system will lock down and notify the fleet manager of the vehicle's location.

An active intervention option is available to the fleet manager to restrict vehicle performance remotely, to encourage the unauthorized driver to pull off the road, or the fleet manager could pass along the vehicle description and its location to law enforcement personnel 9.

Figure 9:
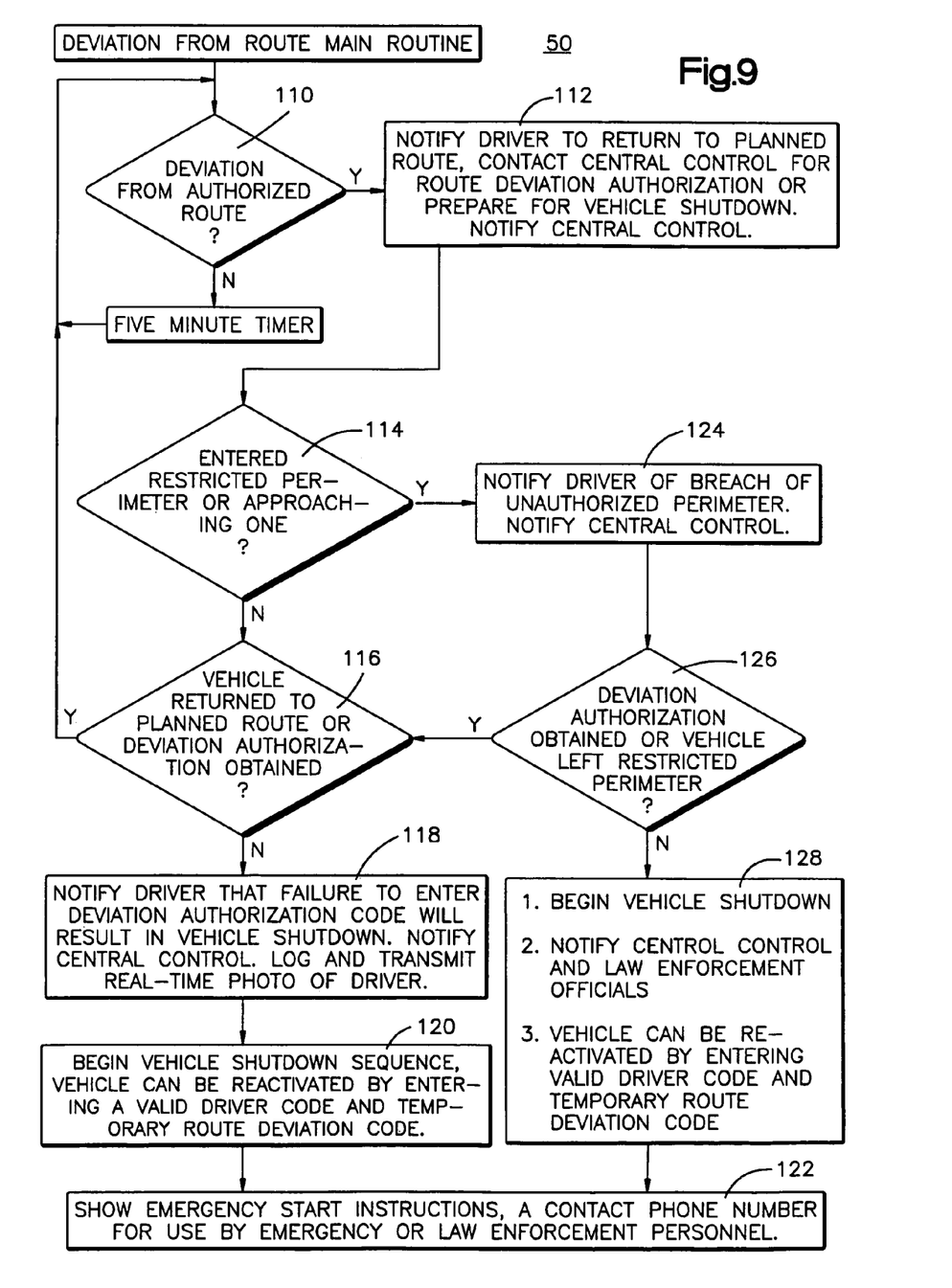
FIG. 9 is a flow chart that illustrates operation of a system for monitoring deviations from a planned route.

FIG. 9 is a flow chart that illustrates the deviation from a planned route check 50. The global positioning system 24 tracks the location of the vehicle 12 and provides the location of the vehicle 12 to the onboard computer 18. The onboard computer 18 determines whether the vehicle has deviated from the authorized route in excess of a predetermined limit at 110. If the onboard computer 18 determines that the vehicle has not deviated from the authorized route, a predetermined amount of time, five minutes in the illustrated embodiment, is allowed to elapse and the check 50 is performed again.

If the vehicle onboard computer 18 determines that the vehicle has deviated from the authorized route in excess of company limits, the driver is notified to return to the planned route, contact central control for route deviation authorization or prepare to shut down the vehicle at 112. In one embodiment, the driver is notified that the vehicle will be shutdown in 15 minutes. The system 10 contacts central control 28 to notify central control 28 that the tractor trailer 16a, 16b has deviated from the authorized route.

The onboard computer 18 then checks to determine whether the vehicle has entered a restricted perimeter or is approaching a restricted perimeter at 114. In the illustrated embodiment, the vehicle onboard computer 18 determines that the vehicle 12 is in a restricted perimeter when the distance between the vehicle global positioning system location and the restricted perimeter global positioning system location is less than a predetermined distance X.

If the onboard computer 18 determines that the vehicle has not entered a restricted perimeter or is not approaching a restricted perimeter, the onboard computer 18 determines whether the vehicle has returned to the planned route or obtained a route deviation authorization code within a predetermined time at 116. In one embodiment, the predetermined time is approximately 15 minutes. If the vehicle has returned to the planned route or obtained a route deviation authorization code within the predetermined amount of time, the deviation from planned route check 50 is repeated after a given period of time elapses.

If the onboard computer 18 determines that the vehicle has not returned to the planned route or obtained a route deviation authorization code within a predetermined amount of time, the driver is notified that failure to enter a deviation authorization code within a predetermined amount of time, five minutes in one embodiment, will result in vehicle shut down at 118. The system 10 notifies central control of the vehicle location and impending shut down. The system 10 logs and transmits a real time photo of the driver in the illustrated embodiment.

Vehicle shut down begins after the predetermined amount of time lapses at 120. The vehicle can be reactivated by entering a valid driver code and temporary route deviation code. The display 20 shows a note on the driver's screen with emergency instructions, a contact phone number for use by emergency or law enforcement personnel to obtain temporary authorization driver codes and route deviation codes at 122.

If the onboard computer 18 determines that the vehicle has entered a restricted perimeter at 114 the driver is notified that an unauthorized perimeter has been breached and the vehicle will be disabled within a given period of time, five minutes in the illustrated embodiment, if a proper authorization code is not entered 124. The system instructs the driver to pull off the road or redirect the vehicle. The system notifies central control 28 of the vehicle location and informs central control 28 that a breach of a restricted area occurred. The system 10 logs and transmits a real time photo of the driver.

The onboard computer 18 monitors information from the global positioning system antenna 24 to determine the position of the vehicle 12. The onboard computer 18 determines whether a route deviation authorization code is entered within the given period of time, five minutes in one embodiment, or the vehicle has left the restricted perimeter at 126. If the onboard computer 18 determines that a route deviation authorization code is entered within the predetermined time or the vehicle has left the restricted area, the onboard computer 18 determines whether the vehicle has returned to the planned route or entered a route deviation authorization code at 116.

If the onboard computer 18 determines that a route deviation authorization code was not entered within the prescribed period of time, or the vehicle has not left the restricted perimeter, the system 10 begins vehicle shut down 128. In one embodiment, vehicle shut down begins immediately. The system 10 notifies central control and law enforcement officials 9 of the vehicle location and that the restricted area has been breached. The vehicle 12 can be reactivated by entering a valid driver code and temporary route deviation code. The system 10 shows a note on the driver's screen with emergency instructions, a contact phone number for use by emergency or law enforcement personnel to obtain temporary authorized driver code and route deviation code 122.

In the exemplary embodiment, authorized vehicle routes are defined by a central control similar to an aircraft flight plan and given a route code number for entry into the onboard computer 18. The driver may deviate from the authorized route within a defined tolerance radius established by central control or if the driver is given a temporary override code by central control. The onboard computer 18 compares the vehicle's global positioning system location to the authorized route to determine compliance.

Restricted areas are considered to be sensitive and should not be entered without specific authorization by the site itself. Examples of possible restricted sites are as follows:
 1. Nuclear facilities
 2. Military posts and/or National Guard Armories
 3. Water supplies
 4. Oil refineries
 5. Suspension bridges
 6. Tunnels Specific global positioning system locations for each site entered into the computer may be offset slightly to avoid providing specific sensitive information about the site. The perimeter around each site can be given a unique radius by the system 10.

In one embodiment, the onboard computer 18 sends a radio message to the restricted site notifying the restricted site of the approaching vehicle and the vehicle's identification. The restricted site may then send a warning that the vehicle is not authorized. If an unauthorized vehicle continues to approach the restricted site after the warning is given, the restricted site controller could then send a second radio signal to disable the vehicle. In one embodiment, the default code could be to disable the vehicle unless the restricted site sends a positive authorization directed to a specific vehicle.

Figure 10:
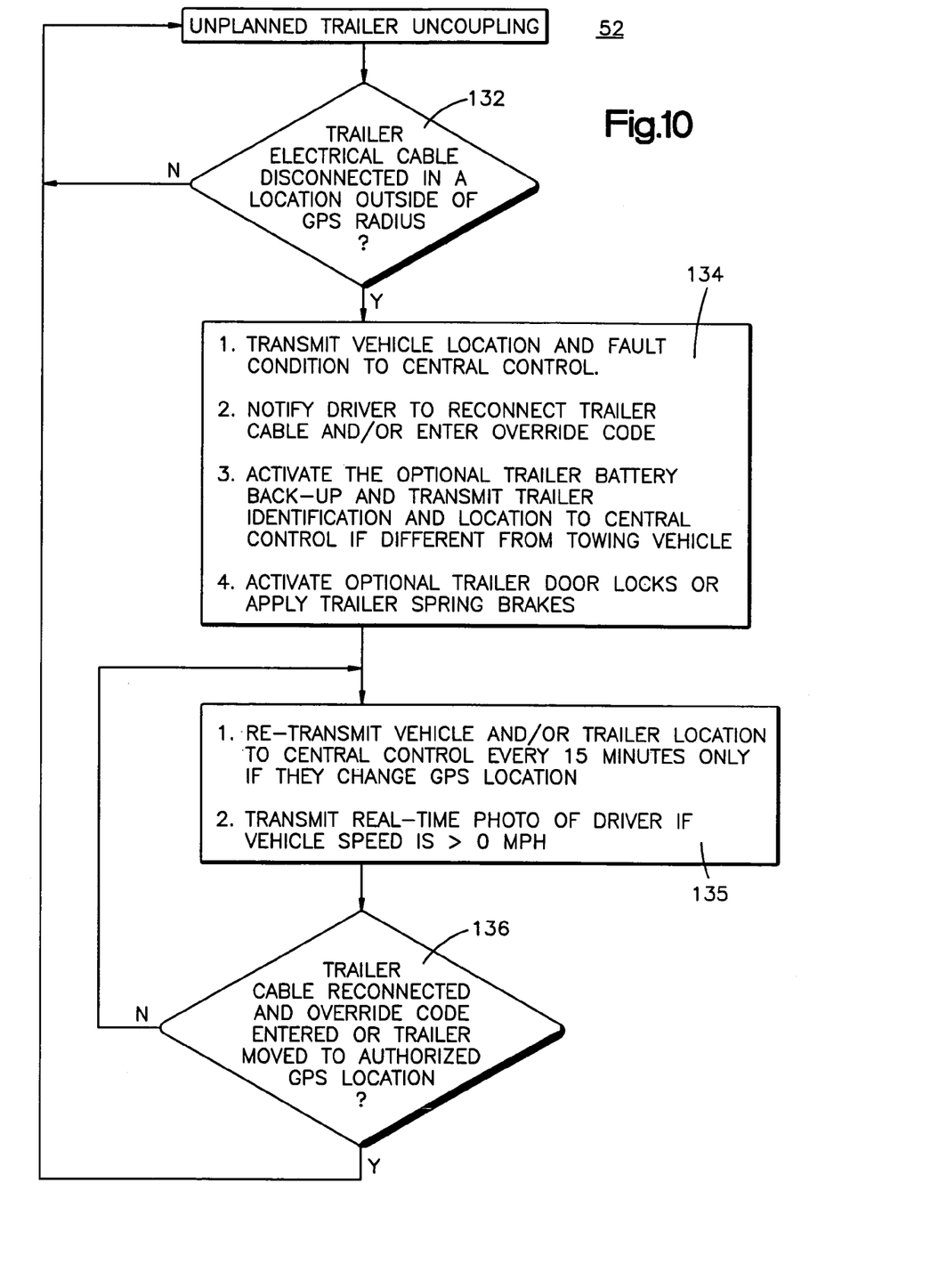
FIG. 10 is a flow chart illustrating a system for monitoring unplanned trailer uncoupling.

FIG. 10 is a flow chart that illustrates the unplanned trailer uncoupling check 52. In the exemplary embodiment, the onboard computer 18 monitors an electrical cable 130 that supplies power to the trailer 16b. In the exemplary embodiment the onboard computer 18 is programmed to define a planned trailer uncoupling location. The onboard computer 18 determines whether the trailer electrical cable has been disconnected at a location outside the planned uncoupling location at 132. In the exemplary embodiment, the planned trailer uncoupling location includes a predefined radius around the selected location.

If the onboard computer 18 determines that the trailer electrical cable has not been disconnected at a location outside the planned global positioning system radius for trailer uncoupling, the routine ends and may be repeated periodically.

If the onboard computer 18 determines that the trailer electrical cable has been disconnected at a location outside the planned trailer uncoupling radius, the satellite communications unit 26 of the system 10 transmits the vehicle location and fault condition to central control 28 at 134. The system 10 notifies the driver that the trailer cable should be reconnected and/or an override code should be entered. An optional trailer battery backup is activated and the satellite communications unit 38 of the trailer 16b transmits the trailer 16b identification and location to the central control 28 if the location is different than the location of the tractor 16a. In one embodiment, the onboard computer 18 of the trailer 16b activates optional trailer door locks, a fifth wheel 87 lock, deflates vehicle tires 89 and/or applies trailer spring brakes. In an alternate embodiment, the onboard computer 18 remotely applies trailer door locks and/or applies trailer spring brakes.

In the illustrated embodiment, the system 10 retransmits the tractor 16a and/or trailer 16b location to central control 28 each time a predetermined amount of time elapses, only if the location of the tractor 16a and/or trailer 16b changes. In the illustrated embodiment, the camera 19 takes a picture of the driver and transmits it real time if the vehicle is moving at 135. The onboard computer 18 continues to monitor the electrical cable 130 that powers the trailer 16b. The onboard computer 18 determines whether the trailer cable has been reconnected and an override code entered or the trailer 16b has been moved to an authorized uncoupling location at 136. If the trailer cable has been reconnected and an override code has been entered, or the trailer 16b has been moved to an authorized uncoupling location, the routine ends or may be repeated after a predetermined amount of time. If the trailer cable has not been reconnected, an override code has not been entered and the trailer has not been moved to an authorized uncoupling location as detected by the global positioning system, the system 10 retransmits the vehicle and/or trailer location if the location has changed at 135.

The system on the trailer 16b is similar to the system on the tractor 16a. Improper disconnection of the electrical cable 130 activates the system on the trailer 16b.

Figure 11:
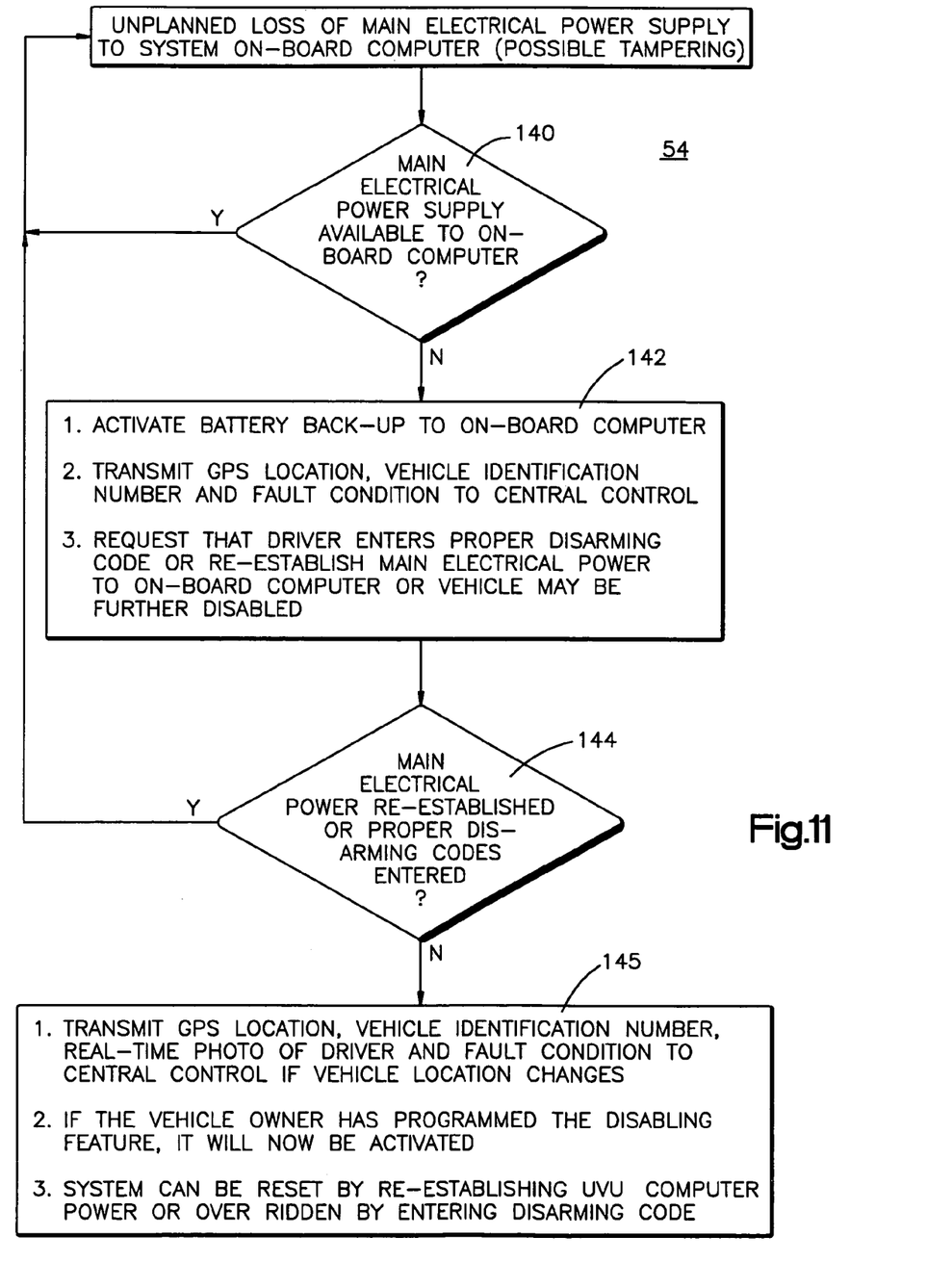
FIG. 11 is a flow chart depicting a system for monitoring unplanned loss of main electrical power to a vehicle onboard computer; and, FIG. 12 is a flow chart illustrating a system for scheduling maintenance.

FIG. 11 is a flow chart that illustrates the unplanned loss of power check 54 to the system onboard computer 18. The system 10 is equipped with a battery backup 100 in the illustrated embodiment for limited satellite communications of global positioning system location in case the main power is shut off prior to entry of properly authorized maintenance codes. A minimum number of daily transmissions of data would be expected. Failure of the system to communicate with the central location may provide an indication of vehicle tampering. An unplanned loss of main electrical power to the system onboard computer indicates possible tampering. The system onboard computer is powered by the vehicle's main power supply 138. The battery backup powers the onboard computer 18 when the main electrical power supply becomes unavailable to the onboard computer 18. The onboard computer 18 determines whether the main electrical power supply is available to the onboard computer 140. If the onboard computer 18 determines that the main electrical power supply is available to the computer 18, the unplanned loss of power routine ends and may be repeated at given time intervals. If the onboard computer 18 determines the main electrical power supply is not available to the onboard computer 18 the battery backup is activated at 142. The onboard computer 18 causes the satellite communications unit 26 to transmit the global positioning system location, the vehicle identification number and fault condition to central control 28. The system 10 also requires that the driver enters a proper disarming code or reestablishes main electrical power to the onboard computer 18 within a predetermined period of time, fifteen minutes in the illustrated embodiment, or the vehicle may be further disabled.

The onboard computer 18 determines whether the main electrical power has been reestablished or proper disarming codes are entered within the given time period at 144. If the main electrical power is reestablished within the given time or proper disarming codes are entered, the unplanned loss of power routine 54 ends and may start again after a predetermined amount of time elapses. If the electrical power is not reestablished and disarming codes are not entered within the given period of time, the system 10 transmits the global positioning system location, vehicle identification number, real time photo of the driver and fault condition to central control 28 if the vehicle location changes at 145. In the exemplary embodiment, this information is transmitted each time a predetermined amount of time elapses, fifteen minutes in one embodiment, until the vehicle stops moving.

In one embodiment, the vehicle owner may program a disable feature that disables the vehicle if the power to the onboard computer 18 is removed. When the disabling feature is programmed, the vehicle 12 will be disabled at this point. The system 10 can be reset by reestablishing the system power or overridden by entering a disarming code.

Figure 12:
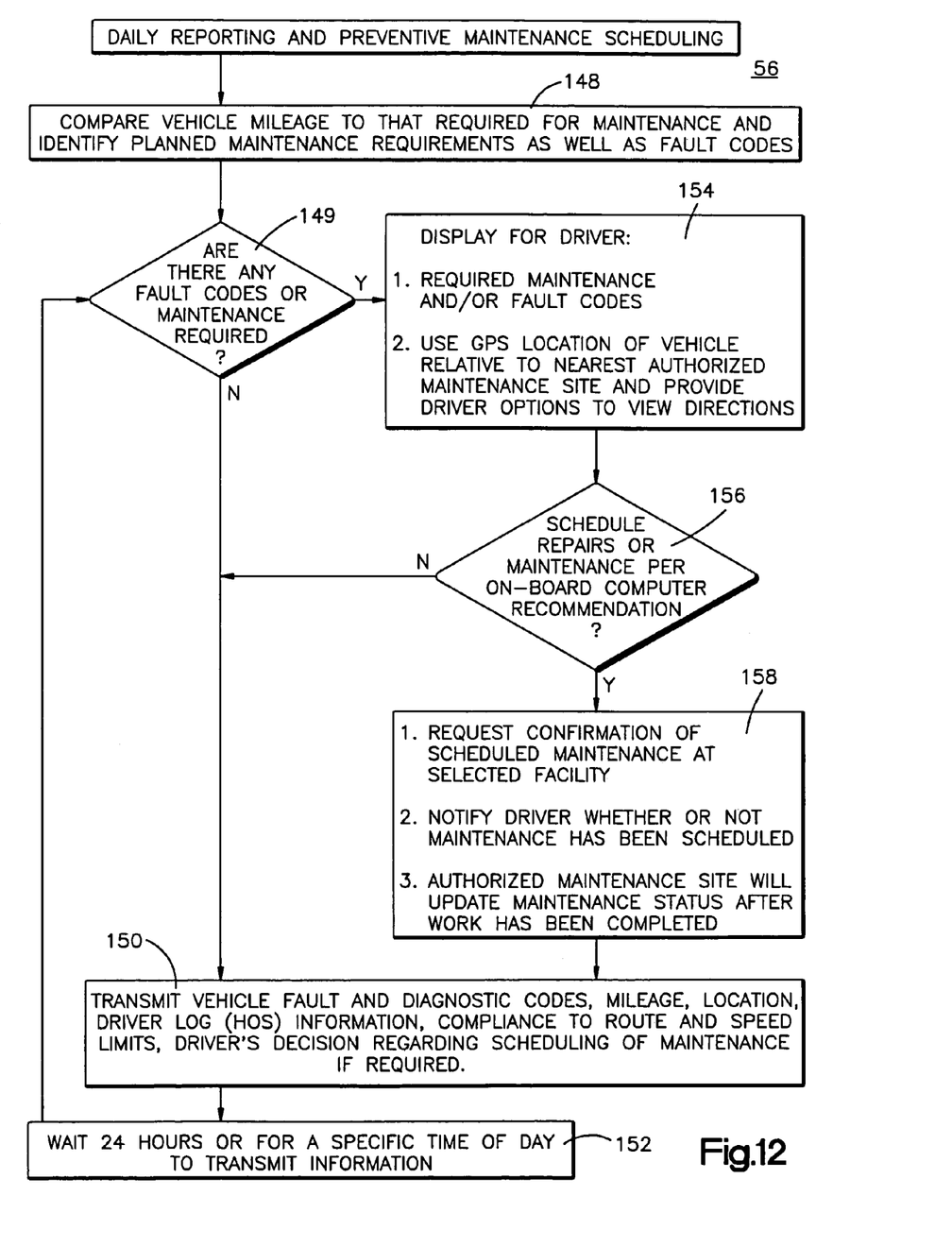

FIG. 12 is a flow chart that illustrates the daily reporting and maintenance check 56. In the illustrated embodiment, the onboard computer 18 compares vehicle mileage from that required for maintenance, identifies planned preventative maintenance requirements and identifies maintenance that fault codes indicate is required 148. The onboard computer 18 determines whether there are any fault codes or there is any planned maintenance that is required 149. If the onboard computer 18 determines that there are no fault codes and no planned maintenance is required, the system 10 transmits vehicle fault and diagnostic codes, mileage, location, driver logged hours of service information, compliance to route and speed limits and the drivers decision regarding scheduling of maintenance required at 150. The daily report/maintenance check 56 waits twenty-four hours or for a specific time of day to transmit this information 152. The daily reporting and preventative maintenance scheduling routine is repeated periodically.

If the onboard computer 18 determines that there are fault codes or planned maintenance is required, the system 10 causes the display 20 to indicate that maintenance is required and/or there are fault codes 154. The onboard computer 18 uses the global positioning system location of the vehicle relative to the nearest authorized maintenance site and provides the driver the option to view directions to the maintenance site and the area in proximity with the maintenance site.

The system 10 then asks the driver if the driver wishes to schedule repairs or maintenance per the onboard computer recommendation at 156. If the driver answers "no" the system 10 transmits vehicle fault and diagnostic codes, mileage, location, driver log hours of service information, compliance to route and speed limits, and the driver's decision regarding scheduling of maintenance at 150. If the driver decides to schedule repairs or maintenance per the onboard computer recommendation, the onboard computer 18 will request confirmation of scheduled maintenance at the selected maintenance facility at 158. The onboard computer 18 notifies the driver whether or not maintenance has been scheduled. The authorized maintenance site will update the maintenance status of the computer 18 after the work has been completed. The vehicle fault and diagnostic codes, mileage, location, driver log hours of service information, compliance to route and speed limits and the driver's decision regarding scheduling of maintenance is transmitted to central control at 150.

The daily reporting and maintenance check allows the central control 28 to monitor the vehicle's maintenance status and the driver's decision regarding required maintenance.

In the exemplary embodiment, the extent to which the vehicle is "shut down" is controlled by the vehicle owner, within limits. The owner may disable or reduce any of the computer controlled functionality of the vehicle to safely inhibit further unauthorized usage of the vehicle. For example, the vehicle owner may reduce the available fuel flow of the vehicle to limit the speed of the vehicle or limit the load a vehicle can handle. A more drastic measure would be to completely shut off the fuel flow or deflate one or more of the vehicle's tires.

The following table provides examples of some of the conditions detected by the unauthorized usage system 10 and responses that may be provided by the system. Information that can be logged with the system using the driver identification includes GPS information, vehicle speed and engine running time. The system can give an alert to the driver or fleet manager when a given driver is approaching or exceeding the safe amount of time on the road without proper rest. Non driving time can be separated by the system using zero speeds or fixed global positioning system positions as defining factors. The system 10 detects driver identification or lack thereof, reaction time or alertness test results, odometer reading and vehicle speed, real time clock and data information, date and time of the usage of the emergency override feature and time and distance driven in the emergency override mode, failure to pull over for retest, including mileage and time beyond reasonable request, global positioning system data for vehicle location and vehicle identification number and description. The driver may be identified by a bar code, a smart key or manual entry of the driver identification number.

| CONDITION | PASSIVE RESPONSE | ACTIVE RESPONSE OPTIONS |
|---|---|---|
| Unidentified driver | 1. Report location and condition to fleet manager via cell phone or satellite communication.<br>2. Request driver to identify self.<br>3. Continue vehicle tracking-GPS. | 1. Notify driver of impending shutdown.<br>2. Shutdown vehicle or alter performance characteristics.<br>3. Ask authorities to intercept vehicle giving them its real time location.<br>4. Activate fifth wheel & trailer door locks. |
| Driver fails alertness test or exceeds HOS (hours of service) limits | 1. Record occurrence in driver's log for future review by fleet manager.<br>2. Notify fleet manager via cell phone or satellite communication. | 1. Disable cruise control.<br>2. Request that driver voluntarily shut down the vehicle.<br>3. Shut down vehicle after warning. |

| CONDITION | PASSIVE RESPONSE | ACTIVE RESPONSE OPTIONS |
|---|---|---|
| Deviation from planned path | 1. Report location & condition to fleet manager. 2. Request driver contact fleet manager. | Shut down vehicle or notify authorities of vehicle location if driver is also unidentified. |
| Unplanned loss of main electrical supply to unauthorized vehicle usage system | 1. Using battery backup, begin transmission of condition & GPS data. 2. Request mechanic enter proper disarming code. | 1. Notify fleet manager or authorities of possible vehicle tampering. 2. Activate trailer fifth wheel, cab door and trailer door locks. |
| Daily Reporting | Transmit location, vehicle maintenance status and driver log information, | Schedule mid trip maintenance and notify driver requirement and location for service. |
| Unplanned trailer uncoupling | 1. Request driver contact fleet manager and/or entry of proper disarm code, 2. Transmit GPS data and condition. | Activate trailer door deadbolt & spring brakes. Notify authorities of last known trailer location & current location of tractor. |

Although the present invention has been described with a degree of particularity, it is the intent that the invention include all modifications and alterations falling with the spirit and scope of the following claims.

I claim:

1. A method of disabling a vehicle, comprising:
a) determining whether an allowable number of service hours has been exceeded by a driver;
b) notifying a central control when said allowable number of vehicle service hours has been exceeded;
c) determining whether said central control provided authorization to exceed said allowable number of vehicle service hours;
d) notifying said driver that the vehicle will be disabled in a given period of time when authorization to exceed said allowable number of vehicle service hours is not granted; and
e) disabling said vehicle.

2. The method of claim 1 further comprising activating the vehicle by entering a valid driver code.

3. The method of claim 1 further comprising activating the vehicle by entering a valid driver code and a valid route code.

4. The method of claim 1 wherein a driver code of said driver is validated after a defined rest period has elapsed.

5. A method of disabling a vehicle, comprising:
a) determining whether an allowable number of service hours has been exceeded by a driver;
b) instructing the driver to stop the vehicle for a rest period when said allowable number of service hours has been exceeded by said driver;
c) determining whether said driver stopped the vehicle for a rest period;
d) determining whether a second driver began operating the vehicle;
e) notifying a central control that said allowable number of vehicle service hours has been exceeded when the driver did not stop the vehicle for said rest period and said second driver did not begin operating said vehicle;
f) determining whether said central control provided authorization to exceed said allowable number of vehicle service hours;
g) notifying said driver that the vehicle will be disabled in a given period of time when authorization to exceed said allowable number of vehicle service hours is not granted; and
h) disabling said vehicle.

6. The method of claim 5 further comprising revalidating a driver code after a prescribed time frame for rest has been achieved.

7. An apparatus for disabling a vehicle, comprising:
a) a vehicle computer programmed to determining whether an allowable number of service hours has been exceeded by a driver; and
b) a communications system coupled to said computer for notifying a central control when said allowable number of vehicle service hours has been exceeded, receiving authorization from said central control to exceed said allowable number of vehicle service hours, and notifying said driver that the vehicle will be disabled in a given period of time when authorization to exceed said allowable number of vehicle service hours is not granted, said computer being programmed to disable said vehicle when said authorization to exceed said allowable number of vehicle service hours is not granted.

8. The apparatus of claim 7 wherein said computer is programmed to activate the vehicle by entering a valid driver code.

* * * * *